United States Patent [19]

Lang

[11] 4,325,286
[45] Apr. 20, 1982

[54] STEERING VALVE MECHANISM HAVING CLOSED NEUTRAL POSITION

[75] Inventor: Armin Lang, Schwäb. Gmünd, Fed. Rep. of Germany

[73] Assignee: Zahnradfabrik Friedrichshafen, AG., Friedrichshafen, Fed. Rep. of Germany

[21] Appl. No.: 65,840

[22] Filed: Aug. 13, 1979

[51] Int. Cl.³ .............................................. F15B 9/10
[52] U.S. Cl. ....................................... 91/373; 91/465
[58] Field of Search ..................... 91/372, 373, 375 A, 91/465

[56] References Cited

U.S. PATENT DOCUMENTS

| | | |
|---|---|---|
| 3,044,569 | 7/1962 | Farmery ................................ 91/372 |
| 3,408,900 | 11/1968 | Tamaki Tomita .................... 91/372 |
| 3,855,904 | 12/1974 | Jablonsky .............................. 91/372 |
| 3,927,602 | 12/1975 | Strauff ................................... 91/372 |
| 3,952,631 | 4/1976 | Strauff ................................... 91/372 |
| 3,967,537 | 7/1976 | Strauff ................................... 91/372 |
| 3,978,770 | 9/1976 | Strauff ................................... 91/372 |
| 4,022,110 | 5/1977 | Strauff .............................. 91/375 A |
| 4,123,964 | 11/1978 | Strauff ................................... 91/465 |
| 4,222,309 | 9/1980 | Ongaro ................................. 91/465 |

FOREIGN PATENT DOCUMENTS

2321857 11/1974 Fed. Rep. of Germany ........ 91/465

Primary Examiner—Abraham Hershkovitz
Attorney, Agent, or Firm—Zalkind & Shuster

[57] ABSTRACT

A pair of inlet valves held closed in the neutral position of a valve actuator are opened under control of a valve operating force transmitted through a regulating spring in response to displacement of the valve actuator from the neutral position. The valve operating force applied is opposed by the pressure in a servomotor chamber to regulate the chamber pressure within a predetermined range above a limiting value of the valve operating force applied. Outlet valves are opened under a servomotor operating pressure higher than the pressure regulated by the inlet valves to control exhaust of fluid from the operating chambers.

4 Claims, 9 Drawing Figures

STEERING VALVE MECHANISM HAVING CLOSED NEUTRAL POSITION

BACKGROUND OF THE INVENTION

This invention relates to hydraulic steering systems having a steering valve that closes the inlet port from a pressure source in the neutral position of its associated valve actuator and is related to the invention disclosed in copending application Ser. Nos. 065,839 and 074,105, filed Aug. 13, 1979 and Sept. 10, 1979, respectively, owned in common by the same assignee.

Steering valves of the foregoing type as compared to those that are open in the neutral position, do not require a continuous flow of the pressure medium so that there are no flow circulation losses while the power steering system is inoperative and less power is thereby utilized. Such steering valves are primarily used for hydro-steering systems having a mechanical connection between the hand steering wheel and a servomotor connected to the vehicle steering linkages and hydraulic assist is required only during vehicle travel along curved paths, but not during straight ahead travel so that a considerable amount of power may be conserved.

In hydrostatic steering systems, a mechanical connection between the hand wheel operating means and the servomotor does not exist. Vehicles so equipped cannot be safely steered at high speeds. However, in such steering systems, loss of power is avoided by circulation of the pressure medium whenever a steering turn remains constant while the vehicle is either at a standstill or in motion.

Steering valve assemblies that block fluid flow from the pressure source in the neutral position of the valve actuator are already known as disclosed, for example, in U.S. Pat. No. 3,855,904 to Jablonsky.

In such prior steering valve assemblies, fluid pressure balanced inlet valves are seated in the neutral position and prevent fluid circulation losses. Whenever the valve-operating hand steering wheel is displaced beyond the limited steering play amount, one of the inlet valves is opened and operating pressure within one of the operating chambers of the servomotor builds up. The inlet valves are so arranged that a feedback force proportional to the servomotor operating pressure may be felt by the vehicle driver on the hand steering wheel to provide the required steering sense. When the steering motion imparted by the driver to the hand steering wheel is terminated, one of the inlet valves is opened rather abruptly through a rigid mechanical connection. As a result, pressurized fluid enters an operating chamber of the servomotor at an excessively high rate to produce flutter in the hydraulic power coupling process. Such flutter could not be heretofore eliminated except by use of a pressure reducer principle involving a rather complex and expensive construction as disclosed, for example in German Patent Document No. OS 12 14 554 to BOSCH.

It is therefore an important object of the present invention to provide a steering valve mechanism having seated inlet valves that block the flow of fluid to the servomotor in the neutral position of the valve actuator and yet prevent development of any flutter. A further object is to provide a steering valve mechanism of the foregoing type through which a feedback reaction from the pressure chamber of the servomotor to the hand wheel operating device is preserved.

SUMMARY OF THE INVENTION

In accordance with the present invention, a hydraulically operated steering system having a pressure source from which pressurized fluid is conducted to the operating chambers of a servomotor, is provided with a steering valve mechanism which includes a pair of pressure biased inlet valves controlled by a hand wheel driven valve actuator through a regulating spring that transmits a valve operating force in opposite directional senses to the respective inlet valves in response to displacement of the valve actuator from a neutral position. A regulated pressure proportional to the valve operating force is thereby established in one of the operating chambers to which pressurized fluid is conducted when the operating force exceeds a minimum limit value.

The regulating spring is so disposed as to transmit the valve operating force to each inlet valve causing it to open when the minimum limiting force is exceeded so that pressure may gradually build up in the pressure chamber of the servomotor in proportion to the operating force without any flutter. The regulating spring thus operates to not only regulate pressure buildup proportional to the operating force, but also enables the inlet valves to act as relief valves through which reaction force proportional to the operating pressure of the servomotor may be felt on the hand steering wheel. The present invention contemplates different dispositions of the regulating spring or springs to directly transfer force between the steering spindle and the inlet valves or at other locations for indirect transmittal of the valve operating force.

According to the present invention, the inlet valves prevent flow of pressure medium in the neutral position as in the case of the prior art aforementioned. Unlike prior art arrangements, however, the inlet and outlet valves are not pressure balanced and there is no fluid loss even though force is applied through the hand steering wheel in order to maintain straight ahead travel of the vehicle on a sloping road or under cross wind conditions. This is achieved by controlling the exhaust of fluid from the servomotor through outlet valves that prevent leakage flow from the servomotor even though the valve operating force applied exceeds the minimum limiting force value. According to certain embodiments of the invention, each operating chamber of the servomotor has assigned thereto one of the inlet valves and one of the outlet valves, each pair of inlet and outlet valves being controlled by a common structural member arranged so that the pressure resisted by the outlet valve is higher than the pressure resisted by the inlet valve. As a result of the foregoing arrangement of inlet and outlet valves, the steering valve mechanism may be simplified and yet avoid the influence of the servomotor operating pressure thereon heretofore associated with prior art steering valve mechanisms. Thus, the steering valve mechanism of the present invention may be housed in a pressure-relieved space.

According to some embodiments of the present invention, a common balance beam is utilized for each pair of inlet and outlet valves so that a common regulating spring may act on both inlet and outlet valves while a supplementary spring acts on the outlet valve to maintain a pressure difference in a proportional pressure regulating range of valve operation. The need for synchronization between plural regulating springs and valve cross sections within close tolerances, may therefore be avoided.

In accordance with another aspect of the present invention, whenever the valve operating force corresponds to valve actuator displacement beyond a certain amount, the proportional pressure regulating actions of the valves are cut off. The operating pressure in the servomotor then increases without any increase in operating force as displacement of the hand steering wheel continues. This cut-off effect is advantageous for parking maneuvers and is simply achieved in accordance with the present invention by use of mechanical stops engageable with the balance beam that operates each pair of inlet and outlet valves. The mechanical stops thus limit the pressure regulating range of the regulating springs.

The present invention may be applied to a hydrostatic steering system by providing inlet valves of the type aforementioned while utilizing the hydrostatic slide valve, operated by mechanical connection to the hand operated metering pump, as the outlet valves aforementioned to control exhaust of fluid from the servomotor chambers.

BRIEF DESCRIPTION OF THE DRAWING FIGURES

The various embodiments of the invention are hereafter described with reference to the accompanying drawings in which.

DETAILED DESCRIPTION OF SPECIFIC EMBODIMENTS

Figure 1:
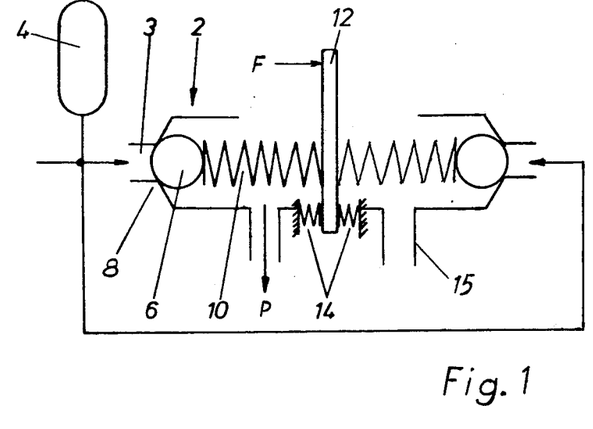
FIG. 1 is a schematic representation illustrating the basic principles underlying a steering valve mechanism constructed in accordance with the present invention.

Referring now to the drawings in detail, FIG. 1 shows an inlet valve 2 disposed in a supply conduit 3 extending from a pressure storage reservoir 4 to an operating chamber of a servomotor (not shown). The inlet valve 2 has a ball valve element 6 and a valve seat 8. A pressure regulating spring 10 is seated between the ball valve element 6 and a part 12 to exert a closing bias on the valve element. The part 12 has a mechanical driving connection to a valve actuator device such as a hand steering wheel (not shown) and is operatively supported for either pivotal or translatory motion. As is often the case, the actuator device has a separate centering mechanism schematically indicated by spring 14 for returning it to a neutral position. Alternatively, the separate centering device may be functionally replaced by the use of two oppositely directed valve regulating springs. The same valve arrangement is disposed on the opposite side of part 12 as shown. The spring space of each of the inlet valves is connected by an outlet conduit 15 to one of the operating chambers of the servomotor. Each inlet valve 2 also functions as a relief valve. Depending on the operation of part 12, a suitable operating pressure is developed in the pressure chamber of the servomotor. The centering springs 14, herein shown as helical pressure springs, in a more practical embodiment will be in the form of any well known bending rod, torsion rod of leaf springs.

The valve regulating springs 10, the centering springs 14 and the cross sections of the valves 2 are correlated so that in the neutral position of the actuator 12, the valve elements 6 will remain closed or seated resisting the opening bias corresponding to a maximum opening pressure prevailing in the supply conduit 3. As a result, no power assist is provided in the neutral position. Whenever part 12 is shifted to the right, for example, by a force F, the force of spring 10 acting on the lefthand ball valve element 6 decreases to reduce its closing bias until the pressure prevailing in the supply conduit 3 overcomes the spring force and lifts the ball valve element 6 from its seat. Pressure fluid will then be conducted to the pressure chamber of the servomotor from the pressure storage 4. A differential pressure between the pressure storage and the pressure chamber of the servomotor is maintained by the regulating spring 10 as the opening bias after the force applied by the actuator device exceeds a limiting value so that proportionality prevails between the operating force F and the operating pressure P in the associated pressure chamber of the servomotor.

Figure 3:
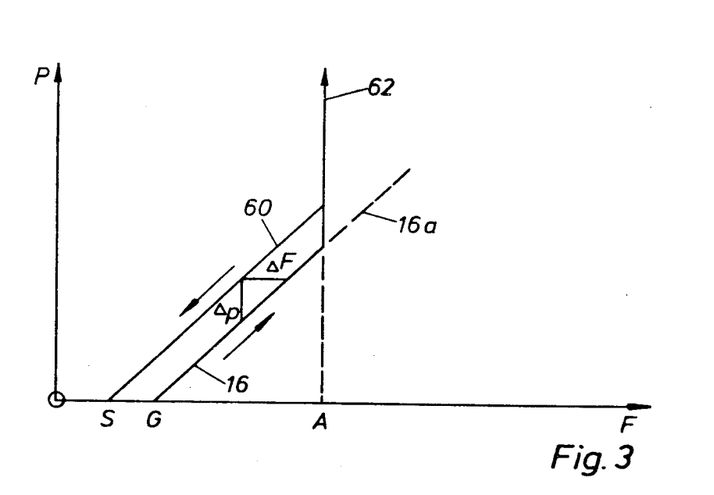
FIG. 3 is a graphical representation of the force and pressure relationships associated with a steering valve mechanism constructed in accordance with the present invention.

FIG. 3 graphically illustrates the relationship between the operating force F and the servomotor pressure P. In response to steering deflection of part 12 from zero by force F, the pressure P in the servomotor at first remains at zero until a limiting force G is reached. Then the pressure P rises proportionately to the force F applied to the hand steering wheel as indicated by straight line curve 16.

The foregoing limiting force characteristic is desirable for a vehicle steering mechanism so that hydraulic assist is thereby avoided for small steering deflections and for the small steering forces necessary to maintain good road contact for the dirigible wheels of the vehicle. Once the limiting force is exceeded, the inlet valve 2 opens gradually, corresponding to the rise of the operating force, to obtain a smooth transition to hydraulic assist. The smooth transition is achieved because of the disposal of the regulating spring between the actuator device and the valve element. The absence of a rigid connection or the use of a lost-motion connection between the actuator device and the valve element is further advantageous because it enables the inlet valve to also operate as an outlet valve. Such dual functioning of the inlet valve 2 would not be feasible if a rigid connection to the actuator device were present.

Figure 2:
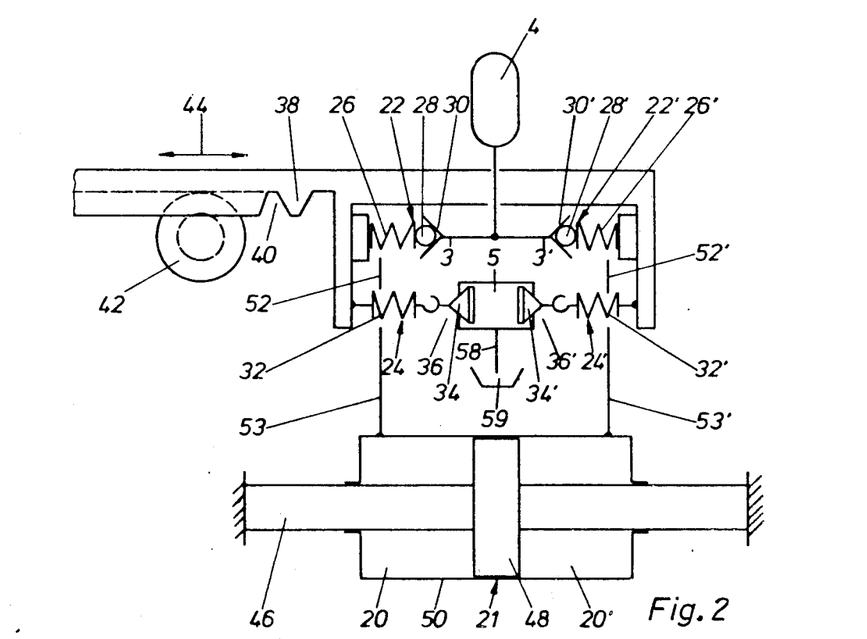
FIG. 2 is a schematic illustration of a power steering mechanism in accordance with one embodiment of the present invention.

FIG. 2 schematically illustrates the basic structure of a steering valve assembly in accordance with one embodiment of the invention having a pure seat valve control operation. A servomotor 21 is provided with opposed operating chambers 20 and 20'. Each operating chamber has a pair of valves assigned thereto. Thus, the operating chamber 20 has an inlet valve 22 and an outlet valve 24 associated therewith while the operating chamber 20' has an inlet valve 22' and an outlet valve 24' associated therewith. Each pair of valves are similar in arrangement and function so that only one pair of valves will be described in detail, it being understood that the same applies to the other pair of valves. The inlet valve 22 includes a pressure regulating spring 26 biasing a ball valve element 28 against a valve seat 30. The outlet valve 24 includes a regulating spring 32 in the form of a tension spring exerting a pulling bias on a valve element 34 in a closing direction against a valve seat 36 in response to valve actuator displacement. The axial ends of the springs 26 and 32, opposite the valve elements, are attached to a rigid actuator part 38 of an operating device. The part 38 has a toothed rack 40 which is displaceable in the direction of the arrow 44 by a pinion 42 to which the hand steering wheel is connected for rotation thereof.

The servomotor 21 includes a piston 48 from which a piston rod 46 extends in opposite axial directions through the operating chambers 20 and 20'. The piston rod 46 is fixed to the vehicle in which the steering system is installed while a cylinder housing 50 of the servomotor is movable relative to the piston 48 held fixed by the piston rod. The spring spaces enclosed about the regulating springs 26 and 32 are in fluid communication with the operating chamber 20, such fluid communication being established by conduits 52 and 53 as schematically illustrated in FIG. 2. Inlet conduits 3 and 3' are connected to pressure reservoir 4 for supply of pressurized fluid to the inlet valves 22 and 22'. A return conduit 58 is connected to both of the outlet valves 24 and 24' for conducting fluid exiting from the outlet valves to the reservoir tank 59. The regulating springs 26 and 32 are appropriately designed or dimensioned to function as centering springs for the actuator part 38 in addition to performing their primary pressure regulating functions.

In the neutral position shown in FIG. 2, there is no power assist for the actuator part 38. The inlet valves 22 and 22' are held closed by spring biases somewhat higher than the valve opening pressure prevailing in the pressure reservoir. Both outlet valves 24 and 24' on the other hand, are opened. Accordingly, both operating chambers 20 and 20' of the servomotor are without pressure.

Whenever the part 38 is shifted to the right by pinion 42, in response to turning of the hand wheel, the regulating springs oppose such movement which is thereby felt at the steering wheel. As soon as the limiting force G, aforementioned, is reached, the bias exerted by regulating spring 26' will be reduced to the point that pressure prevailing in pressure reservoir 4 overcomes the spring force and the operating chamber 20' is pressurized. Prior to reaching this state, the outlet valve 24' is closed by the tension applied to regulating spring 32' by the actuator part 38. Operation of the inlet and outlet valves are synchronized such that the outlet valves always resist a pressure which is higher by a pressure difference $\Delta p$ than the pressure resisted by the inlet valves. Consequently, the pressure medium supplied to the servomotor cannot escape through the outlet valve associated therewith in any operating position of the steering valve assembly. Also, during movement of the actuating part 38 to the right, the regulating spring 32 of the outlet valve 24 remains relaxed so that working fluid may drain into the reservoir tank 59 from the pressure relieved operating chamber 20. The inlet valve 22 remains closed during this entire operation. In response to the pressure buildup in the pressure chamber 20' to a value equal to the reservoir pressure minus the pressure gradient at the inlet valve 22', the cylinder housing 50 of the servomotor moves. As a result of the fluid connections established by conduits 52, 53, 52' and 53' from the valves thereto, the cylinder housing 50 follows the actuator part 38.

In FIG. 3, the curve 16 shows the operational phase associated with the inlet valve, reflected by servomotor pressure vs. working force exerted on the steering wheel. As aforementioned, the pertinent outlet valve always resists a pressure higher than the inlet valve pressure by the pressure difference of $\Delta p$. For the outlet valve, the force and pressure characteristic is represented by curve 60 which ideally is parallel to curve 16 as shown. In no case do the two curves intersect corresponding to a condition in which no simultaneous opening of the inlet and outlet valves occurs on the same side of the servomotor. Accordingly, no servomotor bypassing escape of fluid to the tank 59 is possible. As long as both curves, 16 and 60, are always spaced a distance of $\Delta p$ representing a safety hysteresis characteristic, the pressure fluid will always follow servomotor motion. The curve 60 intersects the F-axis at point S. The distance O-S therefore represents the rise of working force F within the range of the spring 24' in the outlet valve 32'.

Whenever the steering gear is operated by ground forces applied to the steered wheels during return travel from a curved path to a straight path without any operating force applied to the hand steering wheel which is at or close to its neutral position (between O and S in FIG. 3), then both outlet valves 24 and 24' are open and there is an unrestricted circulation of the working fluid between the operating chambers of the servomotor and the reservoir tank 59. The cylinder housing 50 and the steered wheels of the vehicle may therefore move unimpeded in both directions.

The steering gear assembly is sometimes subject to an operational sequence wherein the driver after executing a turn along a curved path, does not release the steering wheel completely but allows it to return slowly while braking the vehicle. The actuator part 38 is accordingly moved from its extreme righthand deflection position, for example, back toward its neutral position. Under the foregoing operational sequence, the force of the regulating spring 26' is initially increased so that any inflow through inlet valve 22' is blocked. If the operating force exerted through spring 26' is then decreased by an amount $\Delta F$ corresponding to the pressure difference $\Delta p$, the outlet valve 24' opens and pressure fluid may escape to the tank 59 from operating chamber 20'. With continued relaxation of the regulating spring 32', and continued escape of pressure fluid from chamber 20', the pressure at the outlet valve 32' drops. This drop in pressure as reflected by curve 60 in FIG. 3 ultimately reaches point S at which the working chambers are relieved of pressure.

Beyond a predetermined maximum force applied to the hand steering wheel, a continued proportional increase in servomotor pressure is no longer desirable. This is particularly true with respect to parking maneuvers. However, feedback sensing of forces acting on the wheels is desirable. Therefore, as shown in FIG. 3, curve 16 is cut off beyond a maximum operating force A. At that point, the pressure P in the pressurized chamber of the servomotor rises sharply along curve 62. The curve 62 corresponds to the cutoff portion 16A of curve 16 as shown in FIG. 3. This cutoff effect is manifested in all of the following embodiments of the invention by cancellation of the action of the regulating springs.

Figure 4:
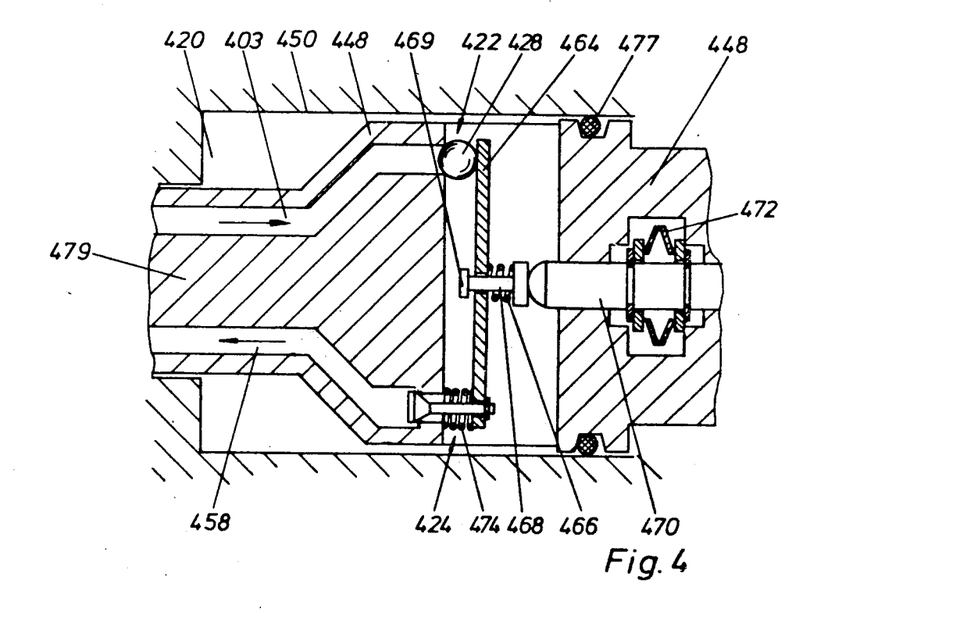
FIG. 4 is a partial side section view through a steering valve mechanism in accordance with a second embodiment of the present invention.

Referring now to the embodiment illustrated in FIG. 4, a servomotor cylinder housing 450 is shown having a piston 448 displaceable therein. The piston is provided with an annular packing 477 in wiping engagement with the cylindrical wall of the housing 450. A piston rod 479 extends axially from the piston. Located within a lefthand portion of the piston is an inlet valve 422 and an outlet valve 424. The same valve pair arrangement is associated with a righthand portion of the piston (not shown). The inlet and outlet valves 422 and 424 are similar in function to the inlet and outlet valves 22 and 24 shown in FIG. 2, except that they are incorporated into the piston structure. In order to insure synchronization of the valves, they are both actuated by a balance beam 464. The inlet valve 422 has no regulating spring of its own. Instead, both valves are operated jointly through a regulating spring 466 engageable with the balance beam centrally between the valves 422 and 424. The regulating spring 466 encircles a lost-motion connector bolt 468 that extends through a central opening in the balance beam and is provided with a stop head 469 at one end. An operating force is applied to the spring 466 through an actuator ram 470 slidable mounted within the piston 448 and axially centered therein by spring elements 472. The operating force applied to the regulating spring 466 by the ram 470 through bolt 468 is equally distributed between the inlet valve 422 and the outlet valve 424 through the balance beam 464. A supplementary spring 474 prestressed by an amount that is one half of the bias of spring 466 in the neutral position, exerts a closing bias on valve 424 through the balance beam 464 in order to maintain the outlet valve 424 free of external forces in the neutral position. Since the outlet valve must always withstand a higher pressure than the inlet valve, the supplementary spring 474 is prestressed by an amount to establish the pressure difference $\Delta p$ between the force necessary to open valve 424 and the force necessary to close inlet valve 422. This pressure difference $\Delta p$ corresponds to that hereinbefore described with respect to FIG. 3.

In the neutral position shown in FIG. 4, the inlet valve 422 is closed and the outlet valve 424 is open. Assuming a steering deflection occurs by displacement of the ram 470 in a righthand direction, the centering springs 472 are stressed while the regulating spring 466 is relaxed. After the operating force applied to ram 470 exceeds the value S as described with respect to FIG. 3, the outlet valve 424 closes under the bias of spring 474. Upon reaching the limiting value G, the force exerted on the inlet valve element 428 is balanced by the inflow pressure in conduit 403. When the limiting force G is exceeded, the inlet valve 422 opens. Pressure fluid will then be conducted from conduit 403 to the pressure chamber 420 of the servomotor causing a buildup of pressure therein, the magnitude of which depends on the force exerted on the hand steering wheel. As a result, the piston 448 moves in a righthand direction following the movement of the ram 470.

When the ram 470 is displaced to its extreme righthand position, the stop head 469 on the lost-motion bolt 468 engages the balance beam 464 to render the regulating spring 466 inactive. The foregoing operational phase corresponds to the cutoff effect as depicted by point A in FIG. 3. At this point, the inlet valve 422 opens so that the whole reservoir pressure becomes effective in the operating chamber 420 of the servomotor. The outlet valve 424 remains closed with its supplementary spring 474 in a position resisting the full reservoir pressure. When the operating force exceeds the cutoff point A, very little additional movement of ram 470 is required for further adjustment of the steered wheels as compared to piston 448 so that further stressing of the centering springs 472 is no longer required. Accordingly, further deflection of the vehicle wheels occurs with little further increase in the operating force, even when further turning of the hand steering wheel occurs.

Figure 5:
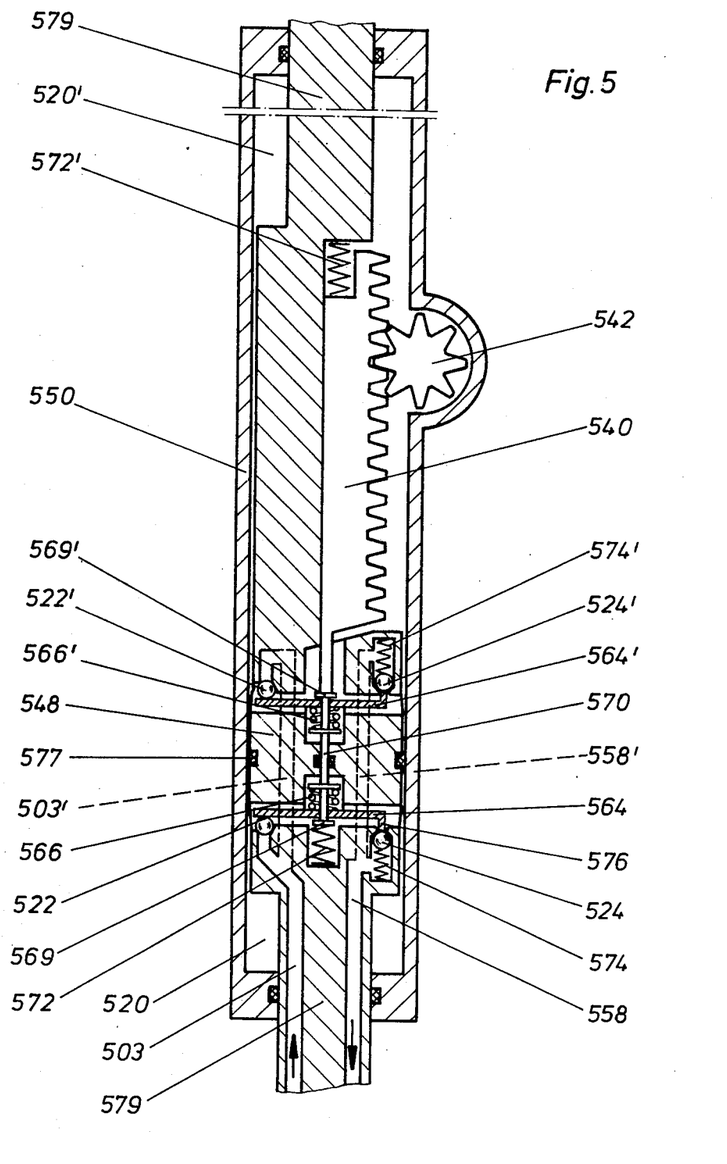
FIG. 5 is a side sectional view of a rack and pinion type of steering mechanism embodying a steering valve similar to the embodiment illustrated in FIG. 4.

FIG. 5 illustrates a rack and pinion steering gear embodiment in which two pairs of valves are associated with balance beams in an arrangement similar to that shown in FIG. 4. A valve actuating ram 570 is rigidly connected to a toothed rack 540. The rack is centered by a pair of centering springs 572 and 572'. The balance beams 564 and 564' transmit operating force from the ram 570 applied through two regulating springs 566 and 566'. Terminal stops in the form of collars 569 and 569' are fixed directly to the ram 570 for engagement with the balance beams 564 and 564' in order to produce the cutoff effect aforementioned in connection with FIGS. 3 and 4. The outlet valves 524 and 524' have supplementary springs 574 and 574' biasing the outlet valves to closed positions opposing the applied forces exerted thereon through extensions 576 and 576' on the balance beams. An inflow passage 503 and a return flow passage 558 are formed in the piston 548 of the servomotor in communication with the inlet valve 522 and the outlet valve 524, respectively. Similarly, inflow and outflow passages 503' and 558' extend through the piston 548 in communication with the inlet and outlet valves 522' and 524', respectively. The operation of the steering valve assembly shown in FIG. 5, is similar to that described with respect to the embodiment of FIG. 4.

Figure 6:
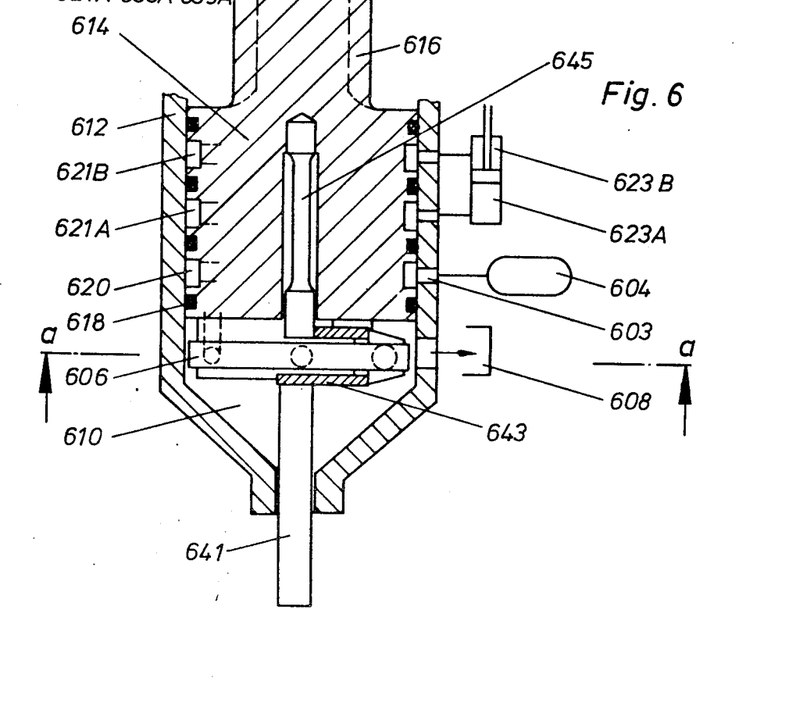
FIG. 6 is a partial side section view through a steering valve mechanism in accordance with yet another embodiment of the present invention.
Figure 6A:
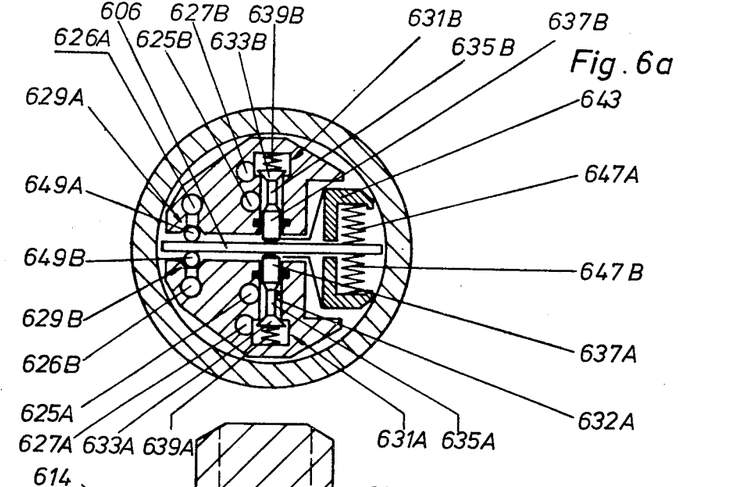
FIG. 6a is a transverse section view taken substantially through a plane indicated by section line 6a in FIG. 6.

According to the embodiments of FIGS. 4 and 5, the parts of the steering valve assembly are housed in the operating chambers of the servomotor so that it was necesssary to extend the steering mechanism into the pressure chambers of the servomotor. According to the embodiment illustrated in FIGS. 6 and 6A, a separate pressure relieved chamber 610 is provided within which a valve actuating balance beam 606 is housed. The chamber 610 is connected to the reservoir tank 608 through a port located in a cylindrical housing 612 fixedly attached to the vehicle structure axially spaced from a cylindrical body 614 rotatable within the housing 612 but axially fixed thereto. The body 614 is formed integrally with a pinion 616 at one axial end, engageable with a toothed rack (not shown) driven by the hand steering wheel. The rotatable body 614 is sealed within the housing 612 by means of four annular seals 618 between which there are located three annular grooves 620, 621A and 621B. The groove 620 is in fluid communication with a pressure reservoir 604 through an inflow port 603 in the housing 612. The grooves 620A and 620B are in fluid communication with two opposed operating chambers 623A and 623B of the servomotor. The cylindrical body 614 is also provided with axial passages 625A, 625B, 626A, 626B, 627A and 627B, as shown in FIG. 6A. The annular groove 620 in communication with the pressure source 604 is connected through the two axial passages 625A, and 625B, with the inflow chambers of two inlet valves 631A and 631B. The operating chamber 623A of the servomotor in communication with the annular groove 621A is connected by the axial passages 626A and 627A to an outlet valve 629A and the spring chamber of an inlet valve 631A. Similarly, the operating chamber 623B of the servomotor is connected through annular groove 621B and the axial passages 626B and 627B to an outlet valve 629B and the spring chamber of the inlet valve 631B. The two inlet valves 631A and 631B are formed in the same manner as pressure relieved valves. Describing, for example, the lefthand valve 631A in FIG. 6A, a piston 637A is housed in a sealed valve bore 632A. A piston rod 635A extends from the piston to a valve element 633A engageable with a valve seat closing one end of the valve bore. High pressure prevailing within the valve bore 632A acts in the same way on both the piston and the valve element. A supplementary spring 639A exerts a closing bias on the inlet valve element 639A and thereby establishes the required pressure difference $\Delta p$ and the hysteresis action aforementioned with respect to FIG. 3. A shaft 641 as shown in FIG. 6, is driven by the hand steering wheel through a steering spindle. The axial end of the shaft 641 within chamber 610 is torsionally connected by means of a fork-like element 643 to one end of a torsion rod 645, the opposite end of the torsion rod being attached to the cylindrical body 614. The fork-like part 643 is supported by two regulating spring 647A and 647B which also act as centering springs engaging one end portion of the balance beam 606 as shown in FIG. 6a. The pistons 637A and 637B associated with the inlet valves 631A and 631B contact the balance beam on opposite sides at the center. The balance beam is contacted on opposite sides adjacent an end opposite the regulating springs 647A and 647B by the outlet valve elements 649A and 649B of the outlet valves 629A and 629B. The cross sectional areas of the pistons 637A and 637B associated with the inlet valves, are twice as large as the cross sections of the valve seats associated with the outlet valves. The distance between the points of contact of the inlet and outlet valves are the same as the distance between points of contact of the inlet valves and regulating springs along the balance beam. Consequently, the regulating springs exert a force on the inlet valves that is twice as great as the force exerted on the outlet valves.

Whenever shaft 641 is turned by the hand steering wheel in one direction to resist turning of the steered wheels causing the fork-like element 643 to move in a righthand direction as viewed in FIG. 6A, the balance beam 606 is displaced under the influence of regulating spring 647B and supplementary spring 639B to close the outlet valve 629B and oppose the closing bias on the inlet valve 631B. After exceeding the limiting force G aforementioned, the inlet valve 631B opens under a regulated pressure in the proportional operating range so that pressure in the operating chamber 623B of the servomotor is established. When the operating force applied to the hand steering wheel exceeds the cutoff point A, a mechanical stop develops between the fork-like element 643 and the balance beam 606. As a result, the inlet valve 631 is held open so that full pressure may become effective in the pressure chamber of the servomotor. Operating fluid on the other hand will always escape from the pressure relieved operating chamber 623A, for example, through the relieved outlet valve 629A into the reservoir tank 608.

Figure 7:
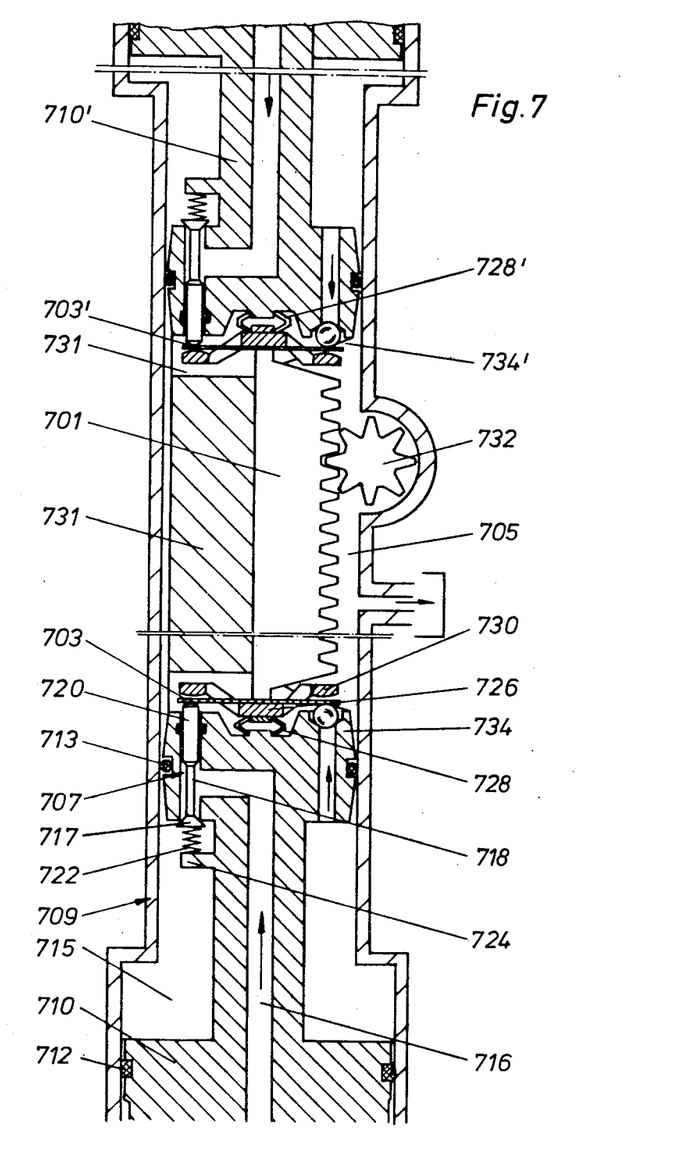
FIG. 7 is a partial section view through a rack and pinion type steering device embodying a steering valve mechanism in accordance with a further embodiment of the invention.

The embodiment illustrated in FIG. 7, is similar to the embodiment described with respect to FIG. 5, except that a toothed rack 701 is associated with two balance beams 703 and 703' housed in a pressure relieved chamber 705 rather than the servomotor chamber. Further, the two balance beams 703 and 703' are formed by leaf springs. The inlet valves 707 associated with the embodiment shown in FIG. 7 are similar to the inlet valves 631 illustrated in FIG. 6A. The steering valve assembly shown in FIG. 7 therefore includes two pairs of inlet and outlet valves 707 and 734 on opposite axial sides of a pinion 732 in meshing engagement with the rack 701 within the pressure relieved chamber 705.

A differential piston 710 is associated with each pair of inlet and outlet valves and is guided for axial displacement in an operating cylinder 709. The axial end portions of the differential piston seal an operating chamber 715 therebetween by means of annular wiping seals 712 and 713. An inflow passage 716 is formed in each piston for conducting high pressure fluid to the inlet valve 707. The inlet valve includes a valve element 717 connected by a piston rod 718 to a piston 720. A supplementary hysteresis spring 722 exerts a closing bias on the valve element 717 by reacting against a projection 724 on the differential piston 710. The piston 720 is engaged by one end of the balance beam 703 mounted on a rocker 726. The rocker is supported by centering spring 728 on the differential piston and is provided with ends 730 forming stops for the end portions of the balance beam in order to establish the cutoff effect aformentioned. The end porton of the balance beam opposite the inlet valve 707 engages the ball valve element associated with the outlet valve 734.

The two differential pistons 710 and 710' are rigidly interconnected by a thrust rod 731. The toothed rack 701 is mounted for axial displacement on the rod 731 in engagement with the pinion 732 to which the hand steering wheel is connected. In the neutral position shown in FIG. 7, both ends of the toothed rack 701 contact the balance beams 703 and 703' under the influence of the two centering springs 728 and 728' supporting the balance beams through the rocker mountings. The beam centering springs and the balance beams jointly form the regulating springs for the inlet and outlet valves. Otherwise, the arrangement and functioning of the inlet and outlet valves are essentially the same as hereinbefore described with respect to FIG. 6 and FIG. 6A.

Figure 8:
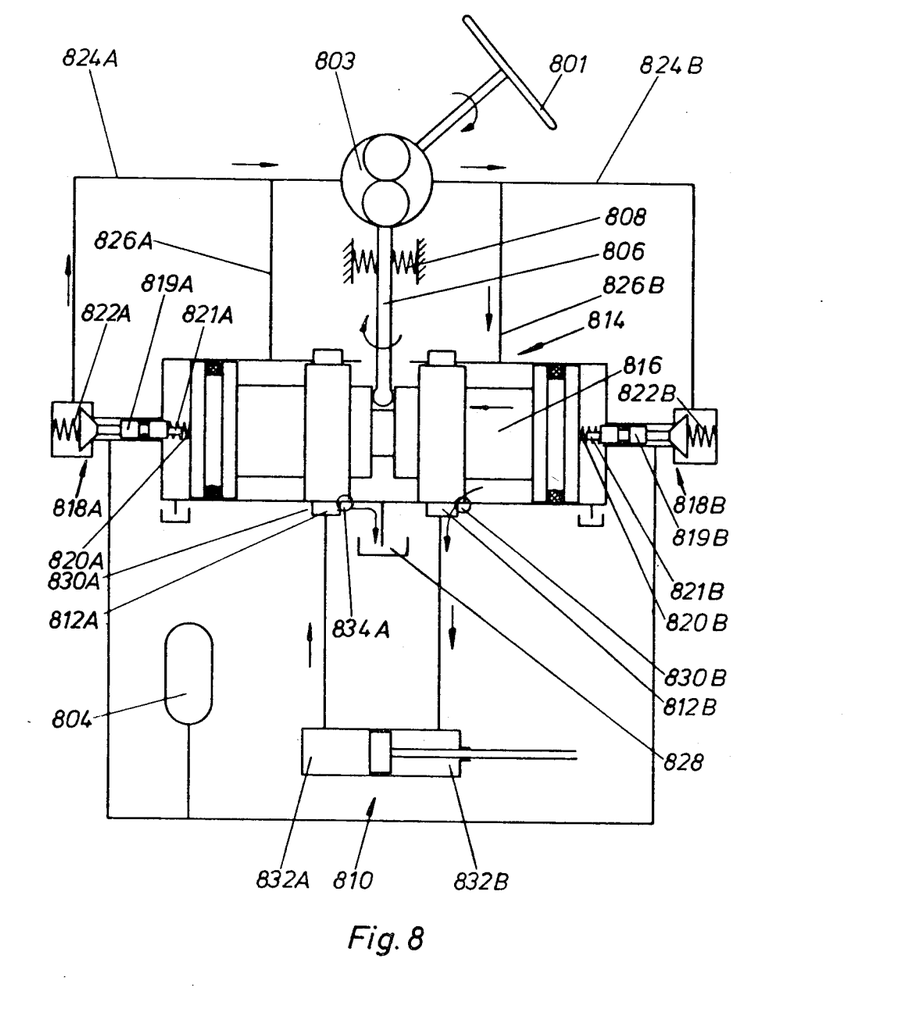
FIG. 8 is a schematic illustration of a still further embodiment of the invention applied to a hydrostatic power steering system.

FIG. 8 illustrates another embodiment of the invention involving hydrostatic steering wherein there is no continuous mechanical connection between the hand steering wheel and the steered parts of the vehicle. As shown, a hand steering wheel 801 drives a steering and metering pump 803. Under normal operation, the pump 803 acts to meter the flow of pressure fluid from a pressure source such as pressure reservoir 804. In the event of pressure failure, pump 803 acts as a hand pump for supply of pressurized fluid. The pump 803 also has a mechanical element in the form of a swivel arm 806 that is centered by a pair of centering springs 808. A servomotor 810 is supplied with pressurized fluid through annular grooves 812A and 812B of an axial piston valve 814, the piston 816 of which is axially displaceable by means of the swivel arm 806.

Two pressure balanced inlet valves 818A and 818B are provided having inlet chambers connected to the constant pressure source 804. The inlet valve 818A, for example, includes a piston 819A from which a stop pin 821A extends, encircled by a regulating spring 820A. The regulating spring is effective to establish the proportional pressure operational phase aforementioned in connection with the inlet valves of the previously described embodiments, by transmitting applied forces from one axial end of the piston 816 to the inlet valve 818A. The proportional pressure phase is terminated at the cutoff point A, when the stop pin 821A contacts the piston 816 whereby the valve 818A is held open under road control. A supplementary spring 822A is also provided to exert a closing bias on the inlet valve. The outlets of the inlet valves are connected by conduits 824A and 824B to the hand pump 803. Branch line conduits 826A and 826B extend to two separate chambers of the axial piston valve 814 which is also provided with an intermediate cylinder space connected to a reservoir tank 828.

In the neutral position shown in FIG. 8, the pressure source 804 is hermetically sealed by the two inlet valves 818A and 818B held in closed positions. No flow losses can then occur. When the hand steering wheel 801 is rotated in one direction, a differential pressure is established by means of the pump 803. Assuming such differential pressure produces flow in the direction of the arrows shown in FIG. 8, pressure fluid will flow through inlet valve 818A without being vented by conduit 824B. Consequently, the arm 806 is displaced by the hand pump 803 in one direction from its center position to displace the valve piston 816 in a lefthand direction. As a result, a flow path is established through a valve passage 830B to the operating chamber 832B of the servomotor from the pressure source through the metering pump 803. The operating chamber 832A of the servomotor is relieved through valve passage 834A of the piston valve 816 to the reservoir tank 828. At the same time, a force is exerted on the regulated spring 820A by the valve piston 816. The inlet valve 818A operates in its proportional regulating range after the limiting force G is exceeded in order to build up pressure in conduit 824A. Whenever a higher pressure is required in the operating chamber 832B than that made available in conduit 824B by hand operation of pump 803, the inlet valve 818A satisfies the increased pressure demand through a slightly rising pressure gradient across pump 803 corresponding to operation of the pump 803 as a fluid motor.

By proper synchronization of supplementary springs 822A and 822B associated with the inlet valves, fluid charging of the system is assured each time a steering operation is initiated from the neutral position. As a result, pressure will develop first on the intake side of the pump 803 before any pressure fluid is permitted to escape from the pressure discharge side through valve passage 830B or 834A. After a certain force applied to the hand steering wheel is exceeded, steering operation proceeds under the cutoff effect as hereinbefore described. The operating force for the regulating springs may either be applied to the steering valve assembly in a manner as shown in FIGS. 6 or 6a or in a manner as shown in FIGS. 2, 5 and 7.

What is claimed is:

1. A valve mechanism for a hydraulically operated steering system having a pressure source (4, 604, 804) from which pressurized fluid is conducted by supply conduits (3, 403, 503, 603, 716) to operating chambers (20, 520, 623, 715, 832) of a servomotor (21, 500, 709, 810) through the steering valve mechanism (2, 22-24, 422-424, 522-524, 631-629, 707-734, 818) which includes a pair of inlet valves (6, 28, 428, 522, 613, 707, 818) blocking flow to the servomotor in a neutral position of an associated valve actuator (12, 38, 470, 570, 641, 701, 806), and a fluid reservoir (69, 608, 828) to which fluid is exhausted from the operating chambers by return conduits (53, 458, 558) through a pair of outlet valves (24, 424, 524, 629, 734, 814); the improvement which comprises: regulating spring means (10, 26, 466, 566, 647, 703-728, 820) operatively connecting the valve actuator to the inlet valves for transmitting a valve operating force in opposite directional senses to the respective inlet valves in response to displacemeent of the valve actuator from the neutral position, whereby a regulated pressure proportional to the valve operating force is established in one of the operating chambers to which pressurized fluid is conducted by one of the inlet valves, differential pressure control means (32, 474, 574, 606, 703) operatively connecting the regulating spring means to the outlet valves for exerting a bias on each of the outlet valves in a directional sense opposite to the valve operating force applied to the associated inlet valve, whereby each of the outlet valves maintains a pressure in each of the operating chambers higher than said regulated pressure established by the associated inlet valve, by a substantially constant pressure difference ($\Delta P$), said differential pressure control means including supplementary spring means (639, 722, 822) exerting a closing bias on each of the inlet valves independently of the pressure of said source in the supply conduits, each of said inlet valves including a valve body having a valve bore, a valve element (633, 717) on which said supplementary spring means acts, and a valve piston (637, 720, 819) slidably mounted in said bore and connected to the valve element, the supply conduits being connected to the valve bores between the valve elements and the pistons, each of the operating chambers having one of the inlet valves and one of the outlet valves assigned thereto for controlling the flow of fluid thereto and exhaust of fluid therefrom, and a balance beam (703) engageable with each of said inlet and outlet valves, said regulating spring means being disposed between the balance beam and the valve actuator.

2. The valve mechanism as defined in claim 1 including lost-motion connecting means between the valve actuator and the balance beam for directly transmitting the valve operating force to the inlet valves after limited travel of the valve actuator relative to the balance beam to fully pressurize the operating chambers of the servomotor.

3. The valve mechanism as defined in claim 2 wherein the balance beam is ineffective to transmit the valve operating force after the limited travel of valve actuator is exceeded, said supplementary spring means being then effective to oppose the full pressure in the operating chamber.

4. The valve mechanism as defined in claim 1 including stop means (730) engageable with the inlet valve for holding the same open when said limited travel of the valve actuator is exceeded.

* * * * *